United States Patent
Bian et al.

(10) Patent No.: US 10,444,433 B1
(45) Date of Patent: Oct. 15, 2019

(54) WAVEGUIDES INCLUDING A PATTERNED DIELECTRIC LAYER

(71) Applicant: GLOBALFOUNDRIES Inc., Grand Cayman (KY)

(72) Inventors: Yusheng Bian, Ballston Lake, NY (US); Abu Thomas, Brookline, MA (US); Ajey Poovannummoottil Jacob, Watervliet, NY (US); Kenneth J. Giewont, Hopewell Junction, NY (US); Karen Nummy, Newburgh, NY (US); Andreas Stricker, Essex Junction, VT (US); Bo Peng, Wappingers Falls, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 16/170,262

(22) Filed: Oct. 25, 2018

(51) Int. Cl.
  *G02B 6/122* (2006.01)
  *G02B 6/136* (2006.01)
  *G02B 6/12* (2006.01)

(52) U.S. Cl.
  CPC ........... *G02B 6/1228* (2013.01); *G02B 6/136* (2013.01); *G02B 2006/12061* (2013.01)

(58) Field of Classification Search
  None
  See application file for complete search history.

(56) References Cited

U.S. PATENT DOCUMENTS

| | | | |
|---|---|---|---|
| 2003/0068152 A1* | 4/2003 | Gunn, III | B82Y 20/00 385/129 |
| 2004/0114869 A1 | 6/2004 | Fike et al. | |
| 2005/0123244 A1 | 6/2005 | Block et al. | |
| 2006/0133754 A1* | 6/2006 | Patel | G02B 6/122 385/129 |
| 2016/0170142 A1* | 6/2016 | Lambert | G02B 6/14 385/28 |

OTHER PUBLICATIONS

Chang et al., "Heterogeneous integration of lithium niobate and silicon nitride waveguides for wafer-scale photonic integrated circuits on silicon", Optics Letters, vol. 42, No. 4, Feb. 15, 2017.

Shang et al., "Low-loss compact multilayer silicon nitride platform for 3D photonic integrated circuits", ©2015 Optical Society of America, Optics Express, vol. 23, No. 16.

Sodagar et al., "High-efficiency and wideband interlayer grating couplers in multilayer Si/SiO2/SiN platform for 3D integration of optical functionalities", ©2014 Optical Society of America, Optics Express, vol. 22, No. 14.

* cited by examiner

Primary Examiner — Chad H Smith
(74) Attorney, Agent, or Firm — Thompson Hine LLP (57) ABSTRACT

Structures that include a waveguide and methods of fabricating a structure that includes a waveguide. A tapered feature composed of a dielectric material is arranged over the waveguide. The tapered feature includes a sidewall that is angled relative to a longitudinal axis of the waveguide.

17 Claims, 9 Drawing Sheets

WAVEGUIDES INCLUDING A PATTERNED DIELECTRIC LAYER

BACKGROUND

The present invention relates to photonics chips and, more specifically, to structures that include a waveguide and methods of fabricating a structure that includes a waveguide.

Photonics chips are used in many applications and systems including, but not limited to, data communication systems and data computation systems. A photonics chip integrates optical components, such as waveguides and bends, and electronic components, such as field-effect transistors, into a unified platform. Layout area, cost, and operational overhead, among other factors, may be reduced by integrating both types of components on a single photonics chip.

The optical components of a photonics chip may be fabricated by patterning the semiconductor material of the device layer of a silicon-on-insulator wafer. The electronic components of a photonics chip may be fabricated by front-end-of-line processing using the semiconductor material of the device layer of the silicon-on-insulator wafer. A dielectric layer stack is deposited over the optical components prior to the formation of the middle-of-line and back-end-of-line interconnect structures. The dielectric layer stack includes a layer of silicon nitride that forms a continuous and unbroken slab over a region containing the optical components, a region containing the electronics components, and a transition region between the region containing the optical components and the region containing the electronics components. The silicon nitride in this slab incorporates hydrogen that, through nitrogen-hydrogen bonds, introduces absorption of the optical signals propagating in the optical components. An unwanted consequence is optical signal loss in the optical components from the overlying silicon nitride, which may be undesirable for long-range routing of the propagating optical signals.

Improved structures that include a waveguide and methods of fabricating a structure that includes a waveguide are needed.

SUMMARY

In an embodiment of the invention, a structure includes a waveguide having a longitudinal axis, and a tapered feature arranged over the waveguide. The tapered feature is composed of a dielectric material, and the tapered feature includes a sidewall that is angled relative to the longitudinal axis of the waveguide.

In an embodiment of the invention, a method includes forming a waveguide having a longitudinal axis, depositing a dielectric material over the waveguide, and patterning the dielectric material to define a tapered feature that is arranged over the waveguide and that includes a sidewall that is angled relative to the longitudinal axis of the waveguide.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
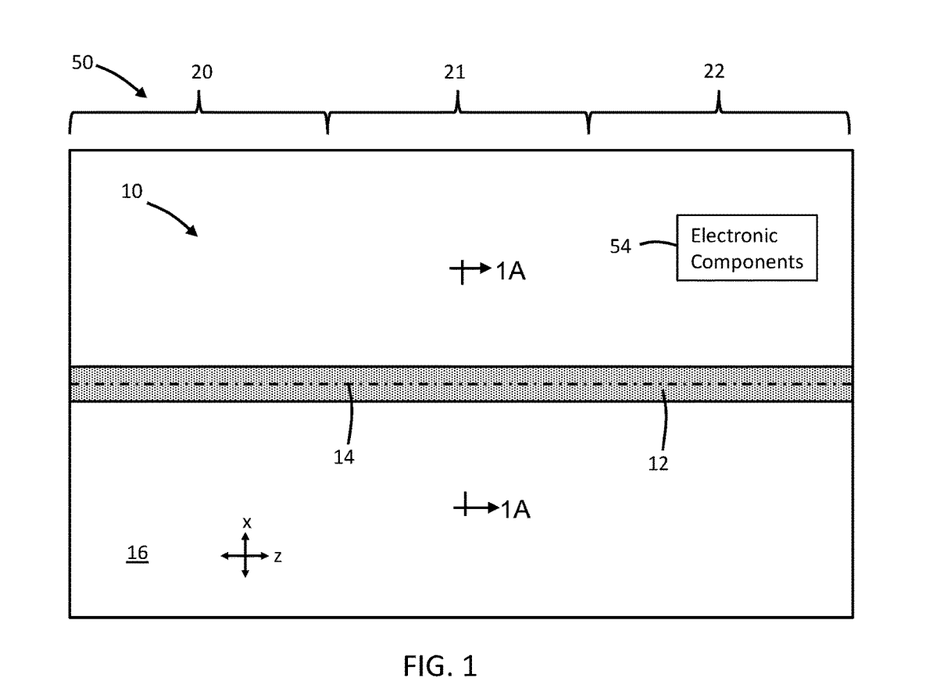
FIG. 1 is a top view of a photonics chip including a waveguide structure at an initial fabrication stage of a processing method in accordance with embodiments of the invention.
Figure 1A:
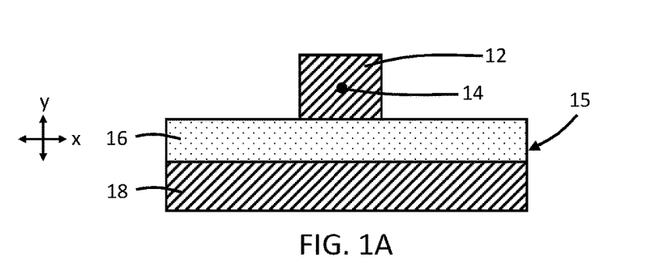
FIG. 1A is a cross-sectional view of the waveguide structure taken generally along line 1A-1A in FIG. 1.

With reference to FIGS. 1, 1A and in accordance with embodiments of the invention, a waveguide structure 10 includes a waveguide 12 with a core composed of single-crystal semiconductor material (e.g., single-crystal silicon). The waveguide 12 may extend lengthwise along a longitudinal axis 14 across a substrate 15. The substrate 15 may be a silicon-on-insulator (SOI) substrate that includes a device layer, a buried insulator layer 16, and a handle wafer 18. The waveguide 12 may be formed by patterning the single-crystal semiconductor material of the device layer with lithography and etching processes that form an etch mask over the device layer and etch the masked device layer with an etching process, such as reactive ion etching (RIE). The waveguide 12 is arranged over the buried insulator layer 16, which may operate as a lower cladding providing confinement for the waveguide 12. The buried insulator layer 16 may be composed of a dielectric material, such as silicon dioxide, that is arranged over the handle wafer 18. The waveguide 12 may route optical signals through a region 20 of the substrate 15 in which signals are routed by waveguides and bends, a region 22 of the substrate 15 that further includes electronic components 54, and a region 21 of the substrate 15 that is arranged to provide a transition between the region 20 and the region 22 and that may lack electronic components.

Figure 2:
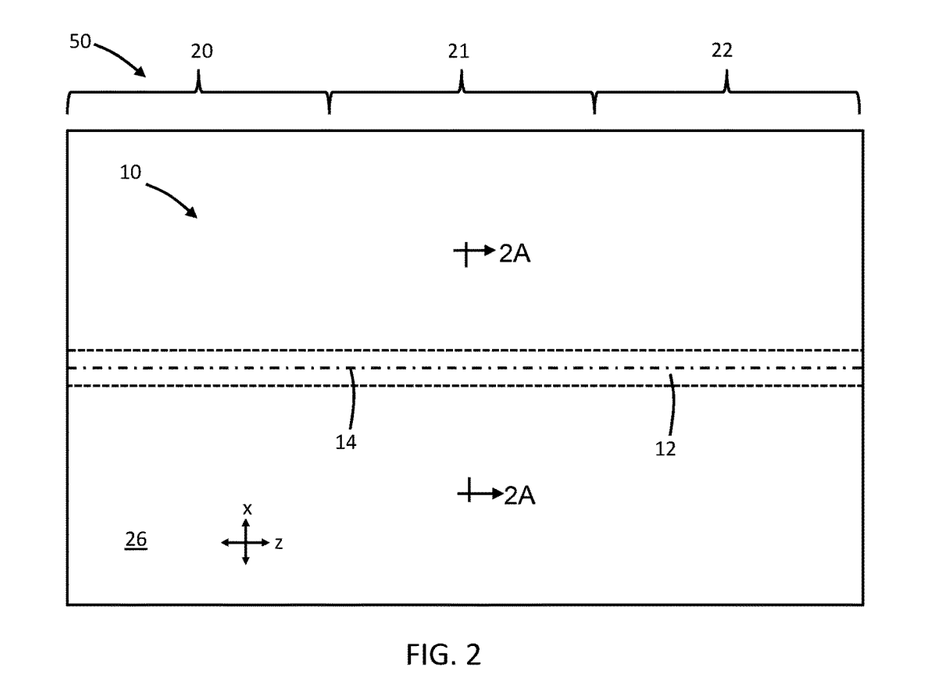
FIG. 2 is a top view of the photonics chip at a fabrication stage of the processing method subsequent to FIGS. 1, 1A.
Figure 2A:
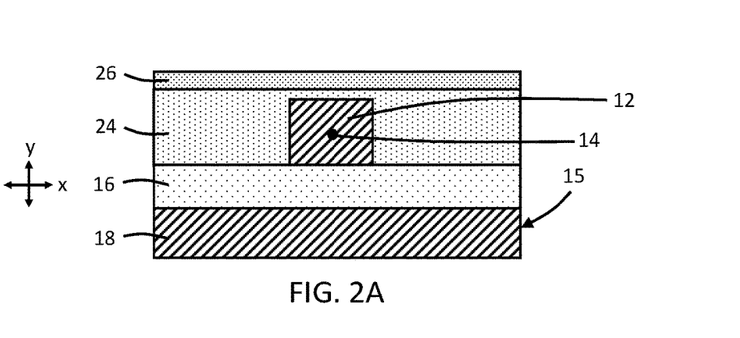
FIG. 2A is a cross-sectional view of the waveguide structure taken generally along line 2A-2A in FIG. 2.

With reference to FIGS. 2, 2A in which like reference numerals refer to like features in FIGS. 1, 1A and at a subsequent fabrication stage, a dielectric layer 24 is formed over the waveguide 12 in all regions 20, 21, 22 and fills the space adjacent to the waveguide 12. The dielectric layer 24 may be composed of a dielectric material, such as an oxide of silicon (e.g., silicon dioxide), deposited by atomic layer deposition (ALD) or chemical vapor deposition (CVD) and planarized by chemical-mechanical polishing. The thickness of the dielectric layer 24 is greater than the thickness of the waveguide 12 such that the waveguide 12 is buried beneath the top surface of the dielectric layer 24.

A dielectric layer 26 is deposited over the dielectric layer 24 in all of the regions 20, 21, 22. The dielectric layer 26 may be composed of a different dielectric material than the dielectric layer 24 and may etch selectively relative to the dielectric layer 24. As used herein, the term "selective" in reference to a material removal process (e.g., etching) denotes that, with an appropriate etchant choice, the material removal rate (i.e., etch rate) for the targeted material is greater than the removal rate for at least another material exposed to the material removal process. In an embodiment, the dielectric layer 26 may be composed of silicon nitride deposited by plasma-enhanced chemical vapor deposition (PECVD). The dielectric layer 26 may find use in other regions of the SOI wafer, such as region 22, containing standard logic devices as a silicide-blocking layer in a so-called OP process. The silicon nitride of the dielectric layer 26 incorporates hydrogen that, through nitrogen-hydrogen bonds, may absorb the optical signals propagating in the waveguide 12. Following its deposition, the dielectric layer 26 defines a continuous slab that is arranged over the waveguide 12.

Figure 3:
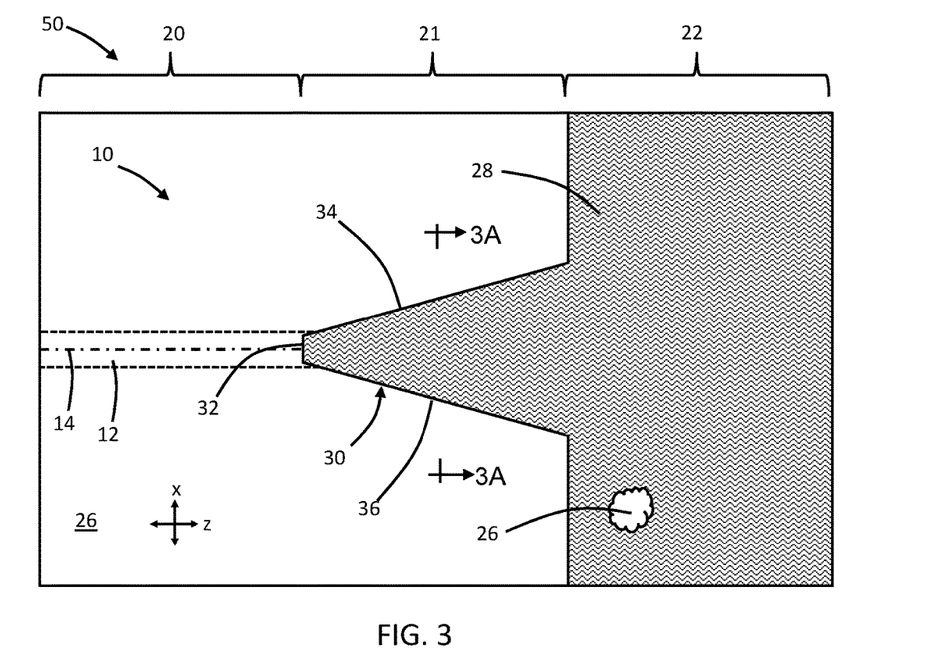
FIG. 3 is a top view of the photonics chip at a fabrication stage of the processing method subsequent to FIGS. 2, 2A.
Figure 3A:
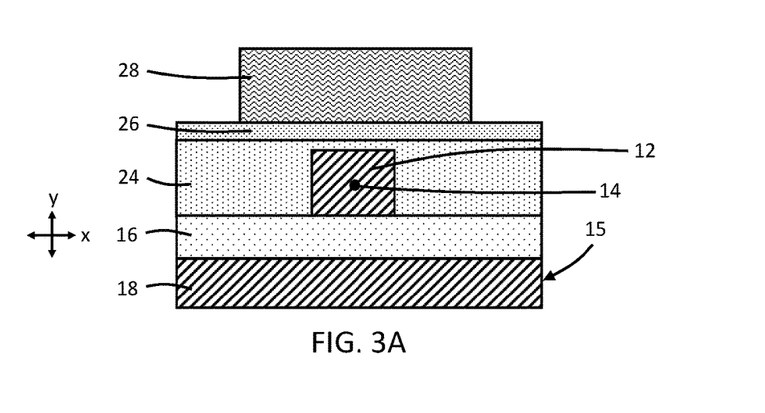
FIG. 3A is a cross-sectional view of the waveguide structure taken generally along line 3A-3A in FIG. 3.

With reference to FIGS. 3, 3A in which like reference numerals refer to like features in FIGS. 2, 2A and at a subsequent fabrication stage, the dielectric layer 26 is patterned by lithography and etching processes. To that end, an etch mask 28 is applied over the dielectric layer 26. The etch mask 28 may be formed by lithography in which a lithography stack including a photoresist layer is applied, exposed to a pattern of radiation projected through a photomask, and developed to form a pattern that is subsequently transferred by etching to the dielectric layer 26. The dielectric layer 26 in the region 20 of the waveguide structure 10 is not masked by the etch mask 28, the dielectric layer 26 in the region 22 of the waveguide structure 10 is fully masked by the etch mask 28, and the dielectric layer 26 in the region 21 of the waveguide structure 10 is partially covered by the etch mask 28. The etch mask 28 in the region 21 has a single taper that is symmetrical relative to the longitudinal axis 14 of the waveguide 12 and that uniformly narrows or tapers in a direction from the region 22 to the region 20.

Figure 4:
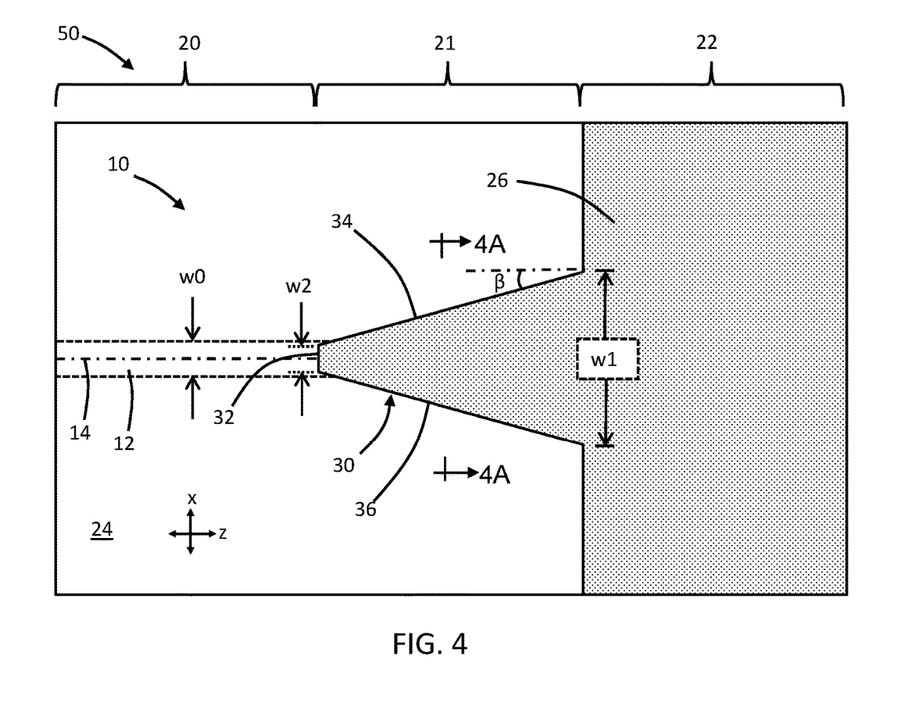
FIG. 4 is a top view of the photonics chip at a fabrication stage of the processing method subsequent to FIGS. 3, 3A.
Figure 4A:
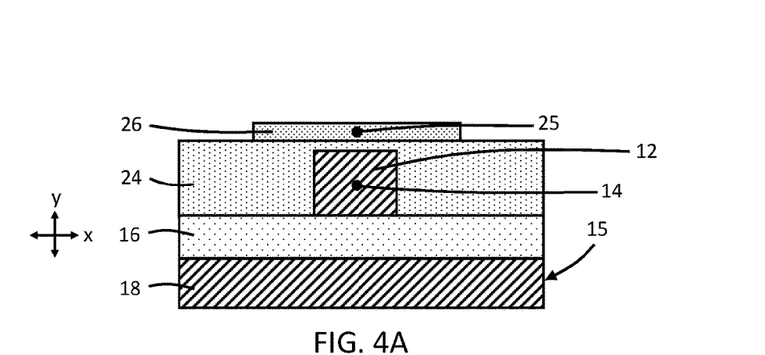
FIG. 4A is a cross-sectional view of the waveguide structure taken generally along line 4A-4A in FIG. 4.

With reference to FIGS. 4, 4A in which like reference numerals refer to like features in FIGS. 3, 3A and at a subsequent fabrication stage, the dielectric layer 26 is patterned by an etching process, such as a reactive-ion etching (RIE) process or a wet chemical etching process with a solution containing hydrofluoric acid, with the etch mask 28 in place over the dielectric layer 26. The dielectric layer 24 may operate as an etch stop for the etching process patterning the dielectric layer 26. In an embodiment, the etching process may penetrate completely through the dielectric layer 26 and stop on the dielectric layer 24. The dielectric layer 26, which is unmasked in the region 20 of the waveguide structure 10, is removed by the etching process from the region 20 to expose the dielectric layer 24 in the region 20. The dielectric layer 26, which is masked by the etch mask 28 in the region 22 of the waveguide structure 10, is protected from the etching process and remains as a continuous slab in region 22. The dielectric layer 26 in the region 21 of the waveguide structure 10 is patterned to have the tapered shape of the etch mask 28 by removing the dielectric layer 26 over areas not covered in the region 21 of the waveguide structure 10. The etch mask 28 is stripped following the performance of the etching process.

The patterning of the dielectric layer 26 in region 21 forms a tapered feature 30 that adjoins and intersects the unetched dielectric layer 26 in region 22 at one end and that terminates at an opposite end 32. The terminating end 32 of the tapered feature 30 may be arranged at or near the interface between regions 20, 21. The tapered feature 30 has angled or inclined sidewalls 34, 36 that are separated by a width, w1, at the intersection with the dielectric layer 26 in region 22 and that are separated by a narrower width, w2, at the terminating end 32 of the tapered feature 30 that is less than the width, w1. In an embodiment, the width, w2, of the dielectric layer 26 at the terminating end 32 of the tapered feature 30 may be less than the width, w0, of the waveguide 12. The tapered feature 30 includes a longitudinal axis 25 that, in an embodiment, may be aligned parallel to the longitudinal axis 14 of the waveguide 12 and displaced vertically from the longitudinal axis 14. In an embodiment, the tapered feature 30 is symmetrical relative to the longitudinal axes 14, 25 in that equal-sized portions of the dielectric material of the tapered feature 30 are arranged on opposite sides of the longitudinal axes 14, 25. The sidewalls 34, 36 of the tapered feature 30 may each be inclined at an angle β relative to the longitudinal axis 14 of the waveguide 12.

The waveguide structure 10, in any of its embodiments described herein, may be integrated into a photonics chip 50 (FIGS. 1-4) that includes electronic components 54 and optical components in both levels. For example, the electronic components 54 may include field-effect transistors that are fabricated by CMOS front-end-of-line processing using the device layer of the SOI wafer. The region 20 may include only optical components such as waveguides and bends, and the region 22 may include electronic components 54 acting as functional devices as well as waveguides and bends. The region 21 functions to provide a transition from the region 20 to the region 22, and each of the regions 20, 21, 22 has different requirements with respect to the dielectric layer 26.

Figure 5:
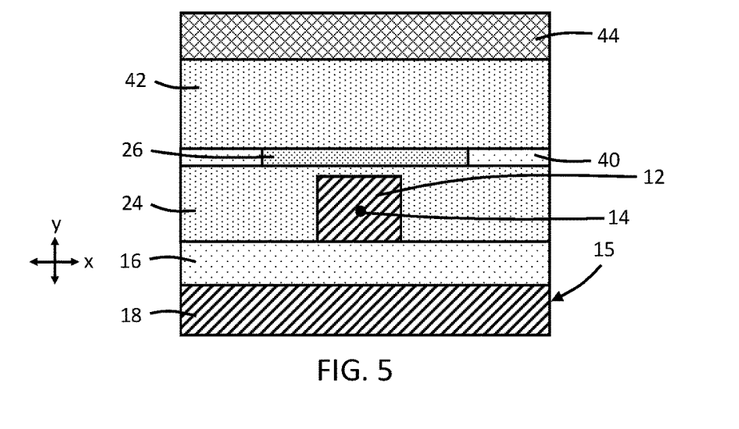
FIG. 5 is a cross-sectional view of the waveguide structure at a fabrication stage of the processing method subsequent to FIGS. 4, 4A.

With reference to FIG. 5 in which like reference numerals refer to like features in FIG. 4A and at a subsequent fabrication stage, a dielectric layer 40 is formed over the waveguide 12 and dielectric layer 24 in region 20, the dielectric layer 26 in region 22, and the tapered feature 30 of the patterned dielectric layer 26 in region 21. The dielectric layer 40 may be composed of a dielectric material, such as an oxide of silicon (e.g., silicon dioxide), deposited by chemical vapor deposition and planarized with, for example, chemical mechanical polishing (CMP) to have a planar top surface. In the region 20, the dielectric layer 40 is in direct contact with the dielectric layer 24. In the region 22, the dielectric layer 40 is in direct contact with the dielectric layer 26. In the region 22, the dielectric layer 40 is in direct contact with the tapered feature 30 of the dielectric layer 26 and with the surface of the dielectric layer 24 that is not covered by the tapered feature 30.

A dielectric layer 42 is formed over the dielectric layer 40. The dielectric layer 42 may be composed of a dielectric material, such as silicon dioxide, deposited by chemical vapor deposition. For example, the dielectric layer 42 may be composed of silicon dioxide deposited by chemical vapor deposition using ozone and tetraethylorthosilicate (TEOS) as reactants. The dielectric layer 42 may be an interlayer dielectric layer containing contacts that extend to electronic components 54 on the photonics chip 50.

Figure 6:
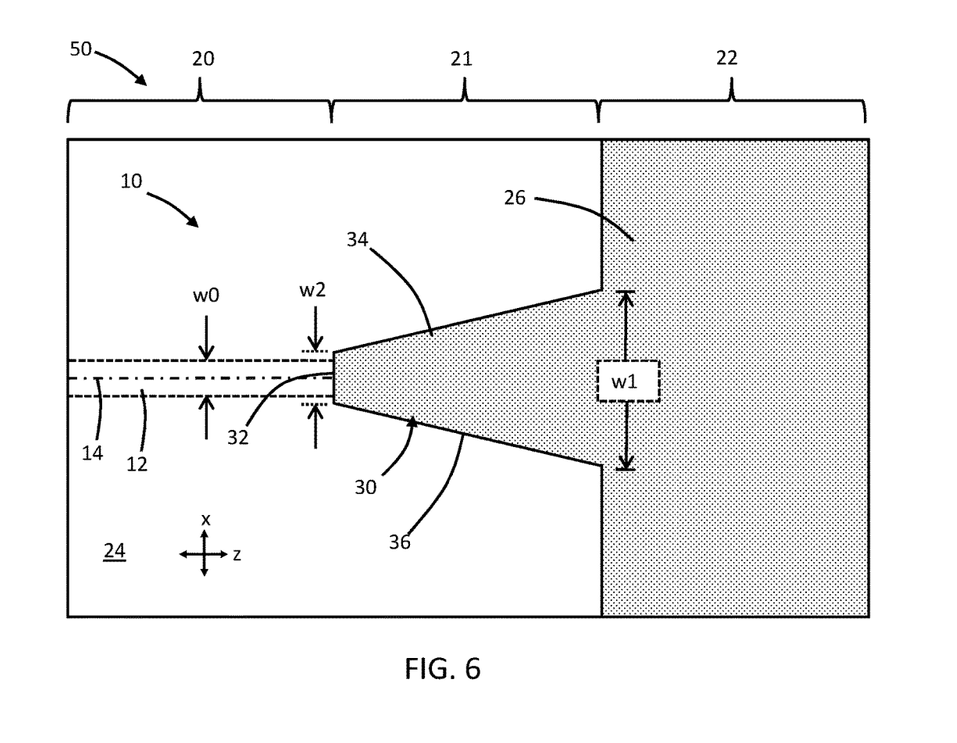
FIGS. 6-10 are top views of photonics chips with waveguide structures in accordance with alternative embodiments of the invention.

A back-end-of-line stack, generally indicated by reference numeral 44, may be formed over the dielectric layer 42. The back-end-of-line stack 44 may include one or more interlayer dielectric layers composed of dielectric materials, such as doped silicon oxides. The back-end-of-line stack 44 may also include metallization composed of, for example, copper, tungsten, or cobalt that may be arranged in the one or more interlayer dielectric layers With reference to FIG. 6 in which like reference numerals refer to like features in FIG. 4A and in accordance with alternative embodiments of the invention, the terminating end 32 of the tapered feature 30 of the dielectric layer 26 in the region 21 may be widened such that the width, w2, of the end 32 is greater than the width, w0, of the waveguide 12 within region 21. The tapered feature 30 with the widened terminating end 32 retains its symmetry relative to the longitudinal axes 14, 25. The dimensions of the etch mask 28 may be modified to provide the dimensional change in the tapered feature 30. The widening of the terminating end 32 may be effective to improve manufacturing tolerances.

Figure 7:
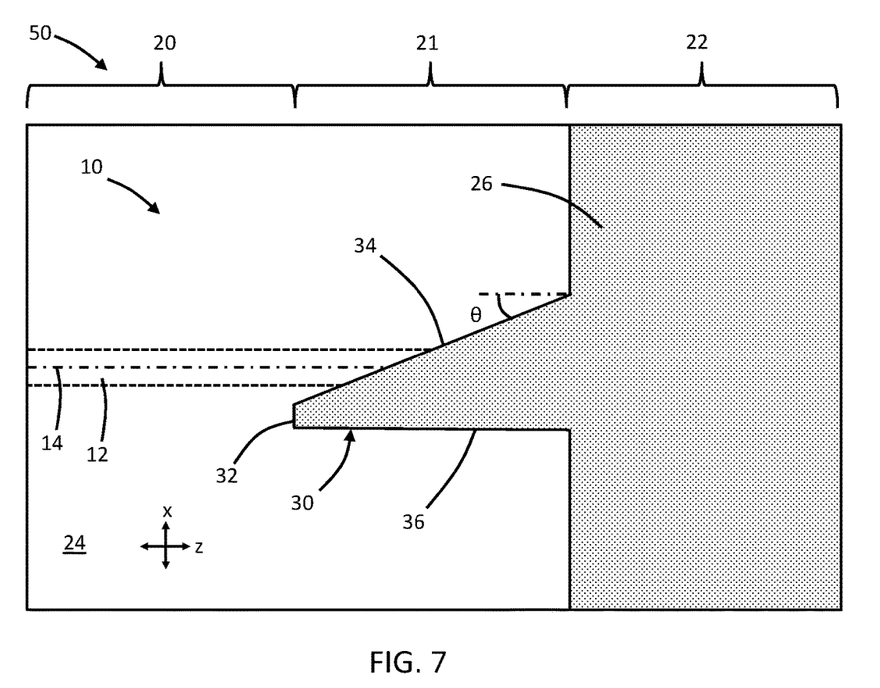

With reference to FIG. 7 in which like reference numerals refer to like features in FIG. 4A and in accordance with alternative embodiments of the invention, only one of the sidewalls 34, 36 of the tapered feature 30 of the dielectric layer 26 in the region 21 may be inclined relative to the longitudinal axis 14 of the waveguide 12. That the tapered feature is a single taper that is asymmetric relative to the longitudinal axis 14 of the waveguide 12. In an embodiment, the tapered feature 30 is symmetrical relative to the longitudinal axis 14 of the waveguide 12 in that equal-sized portions of the tapered feature 30 are centered relative to the longitudinal axis 14. In an embodiment, the sidewall 34 of the tapered feature 30 may be aligned parallel to the longitudinal axis 14 of the waveguide 12 and the sidewall 34 of the tapered feature 30 may be aligned at an angle θ relative to the longitudinal axis 14 of the waveguide 12. For example, the angle θ may be an acute angle in a range of 30° to 60°, and may be 45° in an embodiment.

The changes to the sidewalls 34, 36 shifts the end 32 of the tapered feature 30 to be offset laterally from the longitudinal axis 14 of the waveguide 12 and to no longer be arranged directly over the waveguide 12. The shape and dimensions of the etch mask 28 may be modified to provide the dimensional and shape changes in the tapered feature 30. The inclined sidewall 34 of the tapered feature 30 is arranged over the waveguide 12 and extends across the full width of the waveguide 12. The overlap of the inclined sidewall 34 with the waveguide 12 may be effective to minimize back reflection from the tapered feature 30 into the waveguide 12 and may relax overlay requirements.

Figure 8:
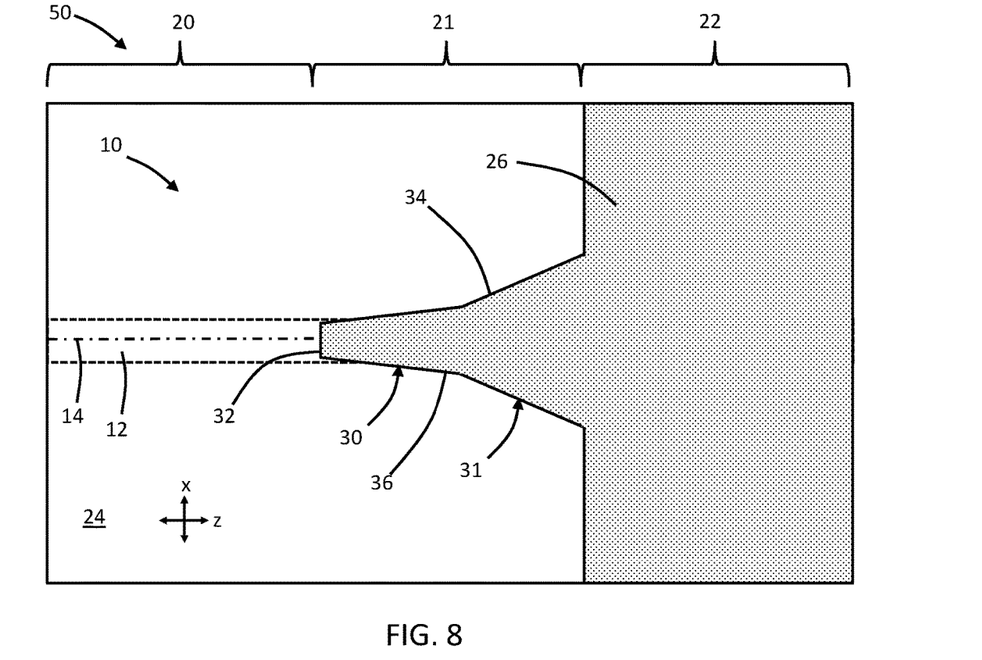

With reference to FIG. 8 in which like reference numerals refer to like features in FIG. 4A and in accordance with alternative embodiments of the invention, the dielectric layer 26 in the region 21 may include multiple tapered features 30, 31 that are arranged as stages in a cascade and that may be arranged symmetrically relative to the longitudinal axis 14 of the waveguide 12. The tapered feature 31 is abutted with the tapered feature 30, and the sidewalls 34, 36 are shared and continuous along the opposite edges of the tapered features 30, 31. In that regard, the tapered features 30, 31 may be formed by patterning the dielectric material of the same deposited dielectric layer 26. The sidewalls 34, 36 of the tapered feature 30 may be each inclined at a larger acute angle relative to the longitudinal axis 14 of the waveguide 12 than the sidewalls 34, 36 of the tapered feature 31. The terminating end 32 of the multiple-taper arrangement may be either narrower or wider than the width of the waveguide 12 in region 21.

Figure 9:
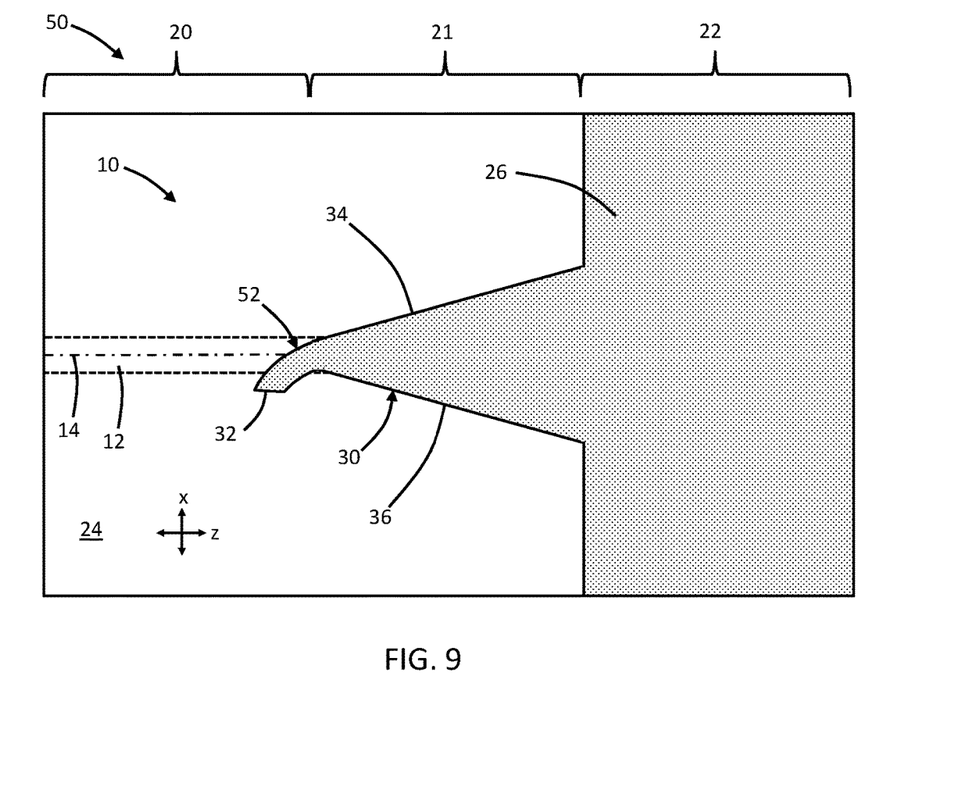

With reference to FIG. 9 in which like reference numerals refer to like features in FIG. 4A and in accordance with alternative embodiments of the invention, a bend 52 may be connected with the tapered feature 30 and may be arranged to terminate the tapered feature 30. The bend 52 may have either a positive curvature or a negative curvature that deviates from the lengthwise direction of the tapered feature 30. The end 32 of the tapered feature 30 is shifted laterally by the insertion of the bend 52 such that the end 32 is not arranged over the waveguide 12.

Figure 10:
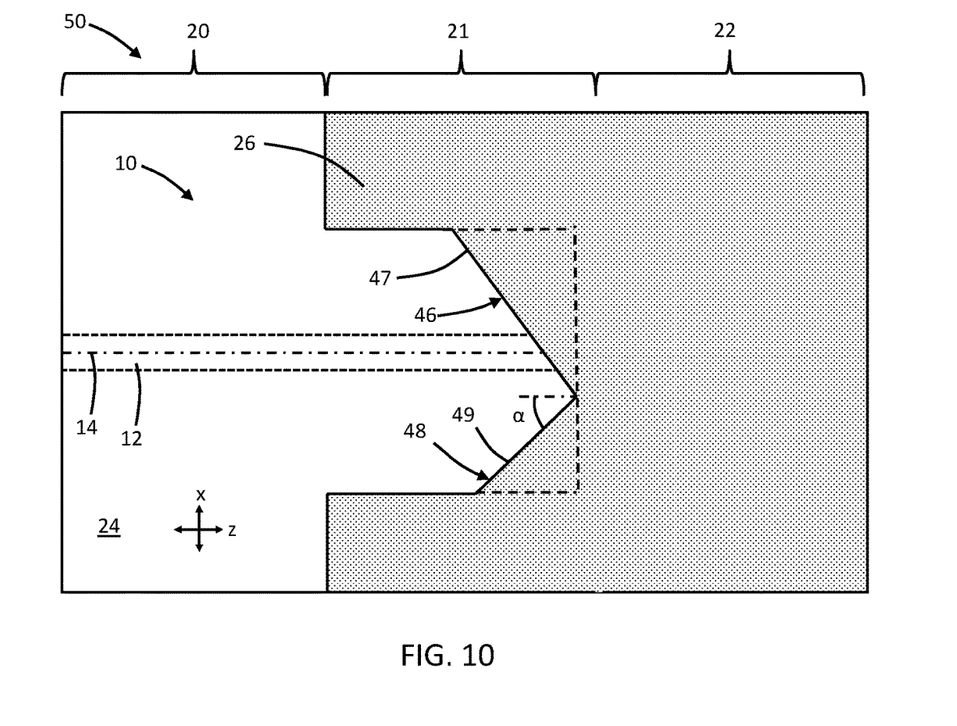

With reference to FIG. 10 in which like reference numerals refer to like features in FIG. 4A and in accordance with alternative embodiments of the invention, the dielectric layer 26 in the region 21 may be patterned to provide multiple tapered features 46, 48 that are arranged over the waveguide 12 in the region 21. The tapered feature 46 includes a sidewall 47 that is inclined at an angle β relative to the longitudinal axis 14 of the waveguide 12, and that extends across the waveguide 12 so that the waveguide 12 is partially covered by the tapered feature 48 in the region 21. The tapered feature 48 also includes a sidewall 49 that is inclined at an angle relative to the longitudinal axis 14 of the waveguide 12 and that intersects the sidewall 47 of the tapered feature 46 to define a geometrical shape that includes dual tapers that are asymmetrically arranged relative to the longitudinal axis 14.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a substrate having a first region, a second region, and a third region between the first region and the second region;
a plurality of electronic components located in the second region of the substrate;
a waveguide having a longitudinal axis, the waveguide arranged in the first region, the second region, and the third region of the substrate; and
a first tapered feature arranged in the third region of the substrate over the waveguide, the first tapered feature comprised of a dielectric material, and the first tapered feature including a first sidewall that is angled relative to the longitudinal axis of the waveguide,
wherein the dielectric material is absent in the first region of the substrate, and the dielectric material fully covers the second region of the substrate.

2. The structure of claim 1 wherein the first tapered feature includes a second sidewall and a terminating end that joins the first sidewall with the second sidewall, and the terminating end of the first tapered feature is arranged over the waveguide.

3. The structure of claim 2 wherein the waveguide has a first width, and the terminating end has a second width that is less than the first width.

4. The structure of claim 2 wherein the waveguide has a first width, and the terminating end has a second width that is greater than the first width.

5. The structure of claim 1 wherein the first tapered feature includes a second sidewall and a terminating end that joins the first sidewall with the second sidewall, the terminating end of the first tapered feature is offset laterally from the longitudinal axis of the waveguide, the waveguide has a width, and the first sidewall of the first tapered feature extends from the terminating end at an angle fully across the width of the waveguide.

6. The structure of claim 1 wherein the waveguide has a width, and the first sidewall of the first tapered feature extends at an angle fully across the width of the waveguide.

7. The structure of claim 1 wherein the first sidewall is angled relative to the longitudinal axis of the waveguide at a first angle, and further comprising:
a second tapered feature arranged over the waveguide, the second tapered feature comprised of the dielectric material, the second tapered feature abutted with the first tapered feature along the longitudinal axis of the waveguide, and the second tapered feature having a second sidewall that is angled relative to the longitudinal axis of the waveguide at a second angle that is less than the first angle.

8. The structure of claim 1 wherein the first tapered feature includes a second sidewall and a terminating end that joins the first sidewall with the second sidewall, and further comprising:
a bend abutted with the terminating end of the first tapered feature, the bend comprised of the dielectric material, and the bend having a curvature relative to the longitudinal axis of the waveguide.

9. The structure of claim 1 wherein the waveguide is comprised of a single-crystal semiconductor material, and further comprising:
a first dielectric layer arranged between the waveguide and the first tapered feature,
wherein the first dielectric layer is comprised of an oxide of silicon, and the dielectric material is comprised of silicon nitride.

10. The structure of claim 9 further comprising:
a second dielectric layer arranged over the first tapered feature,
wherein the second dielectric layer is comprised of an oxide of silicon.

11. The structure of claim 1 wherein the first tapered feature is symmetrically arranged relative to the longitudinal axis of the waveguide.

12. The structure of claim 1 wherein the first tapered feature is asymmetrically arranged relative to the longitudinal axis of the waveguide.

13. A method comprising:
forming a waveguide on a substrate that has a first region, a second region, and a third region between the first region and the second region, wherein the waveguide is arranged in the first region, the second region, and the third region of the substrate;
depositing a dielectric material over the waveguide and the first region, the second region, and the third region of the substrate; and
patterning the dielectric material to define a tapered feature in the third region of the substrate that is arranged over the waveguide and that includes a sidewall that is angled relative to a longitudinal axis of the waveguide,
wherein the dielectric material is removed from the first region by the patterning of the dielectric material, a plurality of electronic components are located in the second region of the substrate, and the dielectric material fully covers the second region of the substrate.

14. The method of claim 13 wherein the waveguide is comprised of a single-crystal semiconductor material, and further comprising:
forming a dielectric layer arranged between the waveguide and the tapered feature,
wherein the dielectric layer is comprised of an oxide of silicon, and the dielectric material is comprised of silicon nitride.

15. The method of claim 13 wherein the waveguide is formed with a width, and the tapered feature is patterned such that the sidewall extends at an angle fully across the width of the waveguide.

16. The method of claim 13 wherein the tapered feature is symmetrically arranged relative to the longitudinal axis of the waveguide.

17. The method of claim 13 wherein the tapered feature is asymmetrically arranged relative to the longitudinal axis of the waveguide.

* * * * *